July 24, 1962 SAKAE FUJIMOTO 3,046,357

MAGNETIC RECORDING AND REPRODUCING MACHINE

Filed Sept. 7, 1960 12 Sheets-Sheet 1

MAGNETIC RECORDING AND REPRODUCING MACHINE

Filed Sept. 7, 1960 12 Sheets-Sheet 9

MAGNETIC RECORDING AND REPRODUCING MACHINE

United States Patent Office 3,046,357 Patented July 24, 1962

3,046,357

MAGNETIC RECORDING AND REPRODUCING MACHINE

Sakae Fujimoto, Chofu, Japan, assignor to Riken Kogaku Kogyo Kabushiki-Kaisha, and Nihon Denki Bunka Kogyo Kabushiki-Kaisha, both of Tokyo, Japan, and both corporations of Japan Filed Sept. 7, 1960, Ser. No. 54,404
Claims priority, application Japan Sept. 12, 1959
4 Claims. (Cl. 179—100.2)

This invention relates to a magnetic recording and reproducing machine and more particularly to a machine of this character adapted to use thin sheets carrying magnetizable coatings.

A chief object of the invention is to provide a machine for magnetically recording sound information and reproducing the recorded information from a thin sheet material such as paper carrying a coating of finely pulverized magnetizable material on one face thereof wherein the sheet remains stationary while a recording and reproducing head or a transducer in contact with said one face of the sheet material is arranged to effect spiral movement relative to the one face. The sheet material may have both faces covered with magnetizable material and have visual information recorded on the second face for reproduction.

An object of the invention is to provide a driving mechanism for a machine of the type described in the preceding paragraph.

Another object of the invention is to provide a machine of the type described, comprising means for producing record matrix or mother plates.

For a better understanding of the nature and objects of the invention, reference should be had to the following detailed description and accompanying drawings in which.

Figure 1:
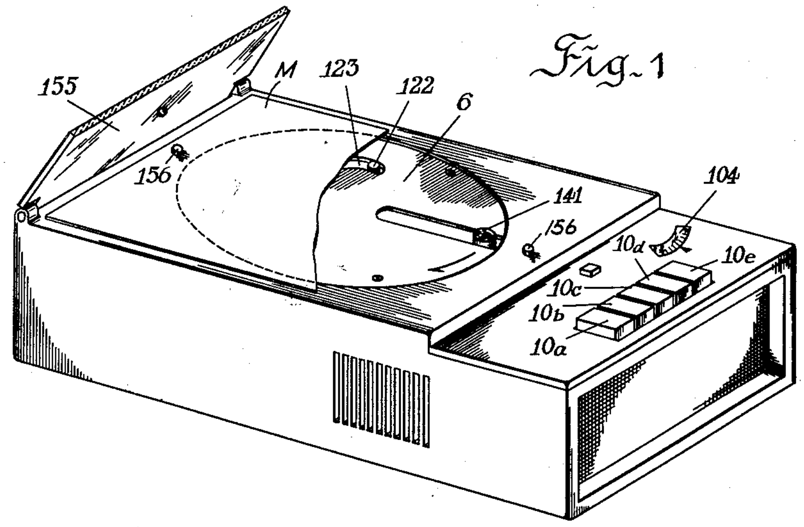
FIG. 1 shows an external view in perspective of a machine embodying the invention with one part broken away.

Referring to the drawings, a base plate 1 (FIG. 7) is horizontally supported in a suitable manner within a casing shown in FIG. 1 and provided on the upper and lower faces with a driving motor and various mechanical components for controlling the drive which will be explained in detail hereinafter. A circular disk 3 having a pendent peripheral wall is rotatably disposed above the base plate with a tubular shaft 2 centrally fixed to the base plate and loosely fitted into a central bore 4 formed in the disk. Above the disk 3 a circular plate 6 (FIG. 1) is coaxially secured thereto by a suitable number, for instance three, of posts 5 rigidly secured to the disk. As shown in FIG. 1 the circular plate or the upper disk 6 is inserted in a circular opening in the top plate of the casing and supported flush with the plane of the top plate. The disks 3 and 6 can be rotated.

Figure 7:
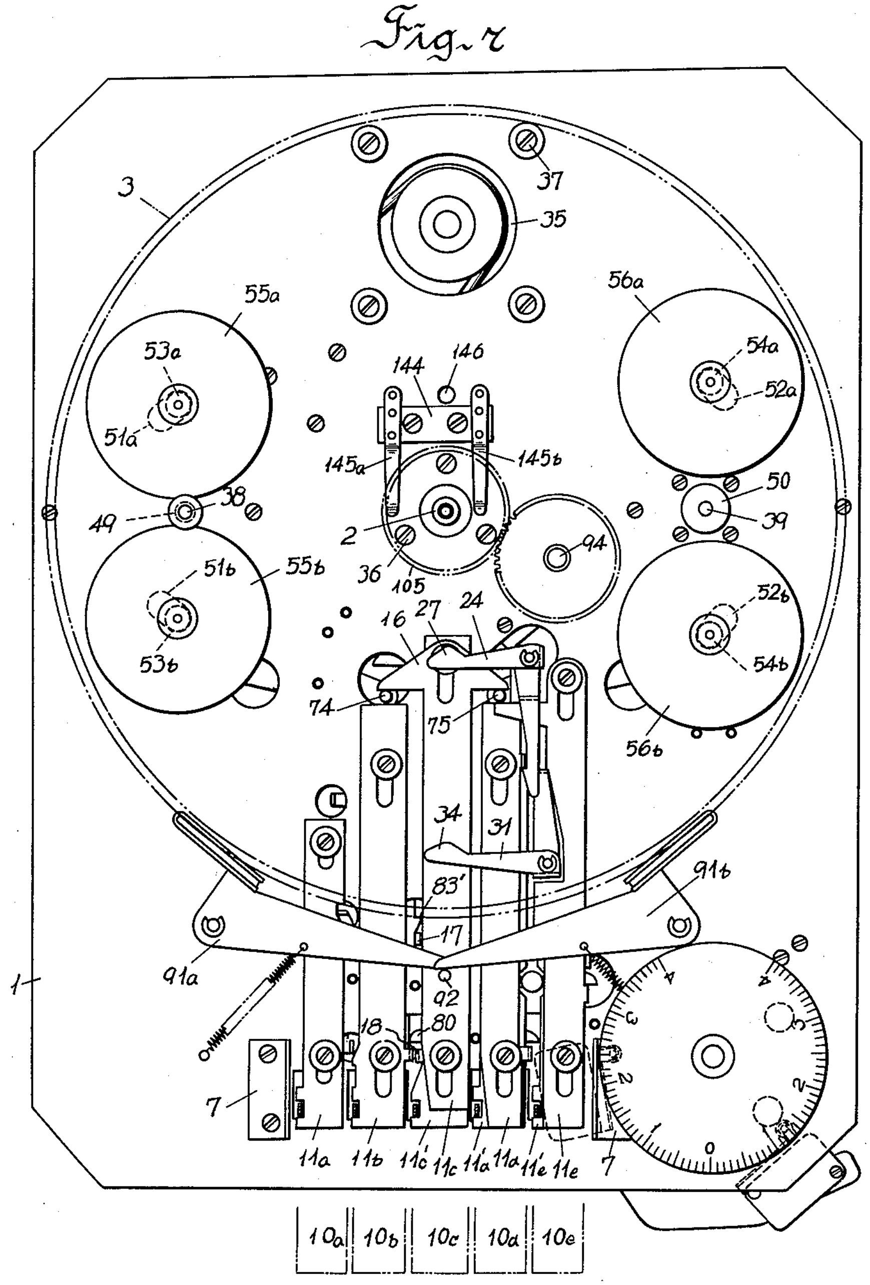
FIG. 7 shows a plan view of a base plate on which the rotary disk is mounted.
Figure 18:
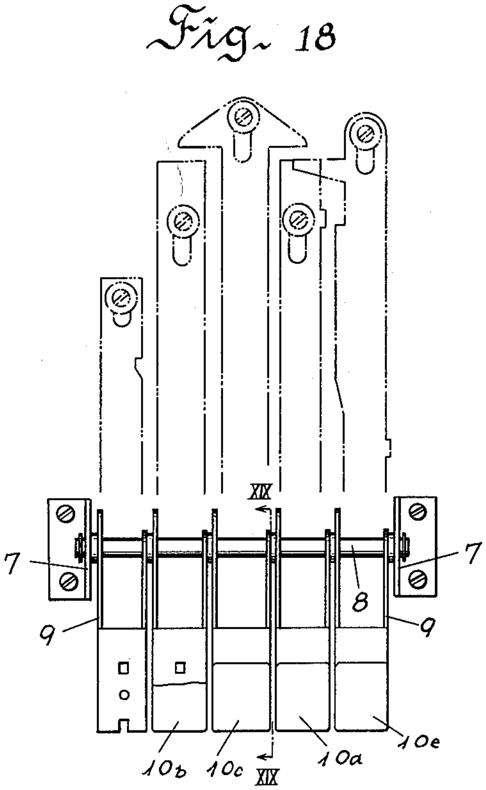
FIG. 18 shows a plan view of the various keys with the certain portions of the locking pieces illustrated in phanton.
Figure 19:
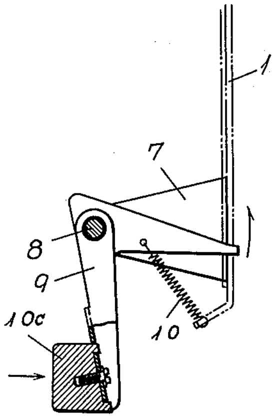
FIG. 19 shows a section taken along the line XIX—XIX in the direction of the arrows in FIG. 18.

A pair of brackets 7 is provided with the base plate on the lower portion as viewed in FIG. 7 and includes a rod 8 carried by the free end portions thereof (also see FIGS. 18 and 19). Five juxtaposed bell cranks 9 are pivoted on the rod 8 and have pendent arms connected through respective tension springs 9 to the lower edge of the base plate as viewed in FIG. 7. The other arm of each bell crank 9 is provided at its end with a key in the form of pushbutton which tends to normally project beyond the plane of the top plate of the casing as illustrated in FIG. 1. Those keys are designated 10*a*, 10*b*, 10*c*, 10*d* and 10*e* successively from the left-hand side as viewed in FIG. 1.

Elongated parallel locking pieces 11*a*, 11*b*, 11*c*, 11*c'*, 11*d*, 11*d'*, 11*e* and 11*e'* are mounted on the base plate 1 for reciprocal sliding movement and have their respective end portions positioned substantially directly below the rod 8 with the other ends extending toward the middle of the base plate. The locking pieces 11*c* and 11*c'*, the pieces 11*d* and 11*d'* and the pieces 11*e* and 11*e'* overlap each other respectively so that the overlapped pieces can effect sliding movement relative to each other.

Figures 16, 17:
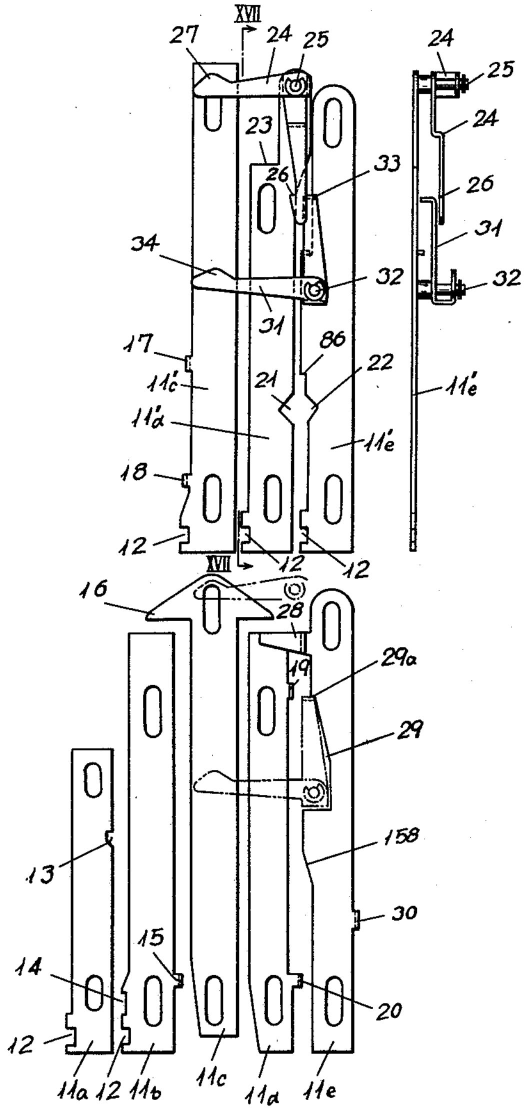
FIG. 16 shows an exploded view of locking pieces interlocking with the various keys.
FIG. 17 shows a section taken along the line XVII—XVII of FIG. 16.

Referring now to FIGS. 16 and 17, the respective locking pieces are illustrated in detail to show their configurations and constructions. Each of the pieces 11*a*, 11*b*, 11*c'*, 11*d'* and 11*e'* is provided on the left-hand edge of the end portion near the rod 8 with a notch 12 which engages the pendent arm of an associated bell crank at the end. Therefore, the depression of any one of the keys effects the longitudinal movement of the associated locking piece toward the middle of the base plate 1 within a range determined by a guide slot formed therein. All of the locking pieces are biased to return to their inoperative positions shown in FIG. 7 by the action of the springs 10 respectively connected to the bell cranks. The locking piece 11*a* is provided on the right-hand side edge with a notch 13. The locking piece 11*b* is provided with a second notch 14 adjacent the notch 12 and also has a pendent lug 15 formed on its other right-hand edge. The locking piece 11*c* has an enlarged head 16 of substantially triangular shape formed integrally with the same on the end near the middle of the base plate and the locking piece 11*c'* includes a pair of pendent lugs 17 and 18 formed integrally therewith on its left-hand edge. The locking piece 11*d* has an upright lug 19 and a pendent lug 20 each formed integrally therewith on its left-hand edge. The locking pieces 11*d'* is provided on its right-hand edge with a V-shaped notch 21. The end portion of the locking piece 11*d'* near the middle of the base plate is recessed to form a shoulder 23 on its left-hand side and is provided at the same end with a bell crank-like lever 24 adapted to be rotated about a pivot 25. The lever 24 tends to be rotated in the clockwise direction as viewed in FIG. 16 by the action of a spring not shown. The arm of the lever 24 extending lengthwise of the piece 11*d'* has its end portion including a hook 26 formed on its left-hand side that is adapted to engage the upright lug 19. The other arm of the lever 24 extends toward the left-hand direction as viewed in FIG. 16, at a level different from that of the first-mentioned arm and includes an angle edge 27 formed on the upper side of the free end. The locking piece 11*e* has an arm 28 projecting beyond the left-hand edge adjacent to the extremity near the middle of the base plate 1, a large notch 29 formed on the same edge adjacent the center, and a pendent lug 30 formed integrally therewith on the right-hand edge. Finally, the locking piece 11*e'* is provided on the left-hand edge with a V-shaped notch 22 opposing the V-shaped notch 21 formed on the piece 11*d'* and includes a bell crank 32 pivoted thereto at a point 32. The bell crank 32 tends to be rotated in the clockwise direction as viewed in FIG. 16 by the action of a spring not shown. However, in order to normally prevent the rotational movement of the bell crank 32 in such a direction, the arm thereof extending longitudinally of the locking piece 11*e'* is provided at the free end with a pendent lug 33 which, in turn normally engages a shoulder 29*a* of the notch 29. The other arm of the bell crank 31 extends in the left-hand direction as shown in FIG. 16 at a level different from that of the first mentioned arm thereof and includes an angle edge 34 formed at the free end inside of the bell crank.

Figure 20:
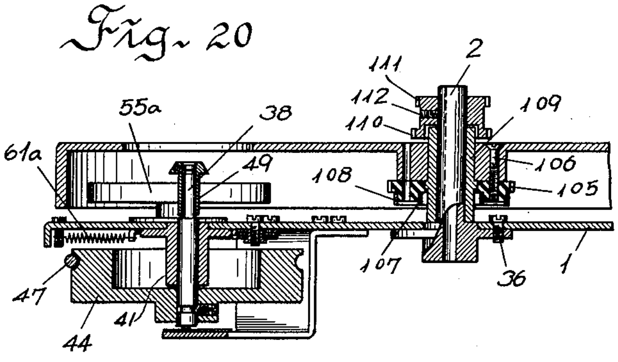
FIG. 20 shows a section taken along the line XX—XX of FIG. 10 with the components on the rotary disk removed.

Referring back to FIG. 7, the base plate 1 includes a vertical tubular shaft 2 and a capacitor motor 35 secured thereto respectively at points in the vertical plane containing the line of the longitudinal axis of the locking piece 11*c*. The tubular shaft 2 is rigidly secured in the center of the upper face of the base plate 1 (as viewed in the drawing) by means of screws 36 extending through the plate and screwed in a flange 2' integral with the shaft 2. The shaft 2 extends through, and projects perpendicularly beyond, the base plate (FIG. 20) whereas the motor 35 is rigidly secured by means of screws 37 on the opposite or lower face of the base plate to be suspended therefrom. A pair of collar sleeves 40 and 41 are diametrically secured to the base plate with the collars brought in contact with and fastened to the lower face of the plate by means of screws 42 and 43 (FIGS. 8 and 20) respectively. The sleeves 40 and 41 rotatably mount the respective vertical shafts 38 and 39 which at their lower ends have grooved wheels 44 and 45 and respectively secured thereto. The wheels serve as flywheels. The shafts 38 and 39 at their upper portions which project upwardly beyond the base plate have the respective friction drive wheels 49 and 50 rigidly secured thereto (FIGS. 7 and 20). The shafts 38 and 39 are suitably held in position in a manner such as shown in FIG. 20. As clearly shown in FIG. 8, a grooved wheel 46 coupled to the motor 35 interlocks with the grooved wheels 44 and 45 through belts 47 and 48 respectively. The drive wheel 49 is smaller in diameter than the drive wheel 50 and may be replaced by another wheel having somewhat different diameter in accordance with the frequency of the electric power supply.

As seen in FIG. 7 the base plate 1 is provided with slots 51*a* and 51*b*, and 52*a* and 52*b* symmetrical with respect to a line joining the axes of the shafts 38 and 39. The slots 51*a* and 51*b* are inclined toward each other such that the extensions of their longer axes intersect each other at a point farther apart from the central shaft 2 and preferably at a point 59 near one side of the base plate. Similarly, the slots 52*a* and 52*b* are inclined toward each other such that the extensions of their longer axes intersect each other at a point 60 near the opposite side of the base plate. Vertical spindles 53*a*, 53*b*, 54*a* and 54*b* loosely inserted into the slots 51*a*, 51*b*, 52*a* and 52*b* respectively include friction transmission wheels 55*a*, 55*b*, 56*a* and 56*b* secured thereto at their top ends respectively, and include collars 57*a*, 57*b*, 58*a* and 58*b* secured thereto at their lower ends respectively. These collars 57*a*, 57*b* and 58*a*, 58*b* are connected to pins planted in the base plate at said points 59 and 60, through respective tension springs 61*a*, 61*b*, 62*a* and 62*b* respectively which bias the spindles 53*a* through 54*b* to the outer ends of the corresponding slots.

Figure 8:
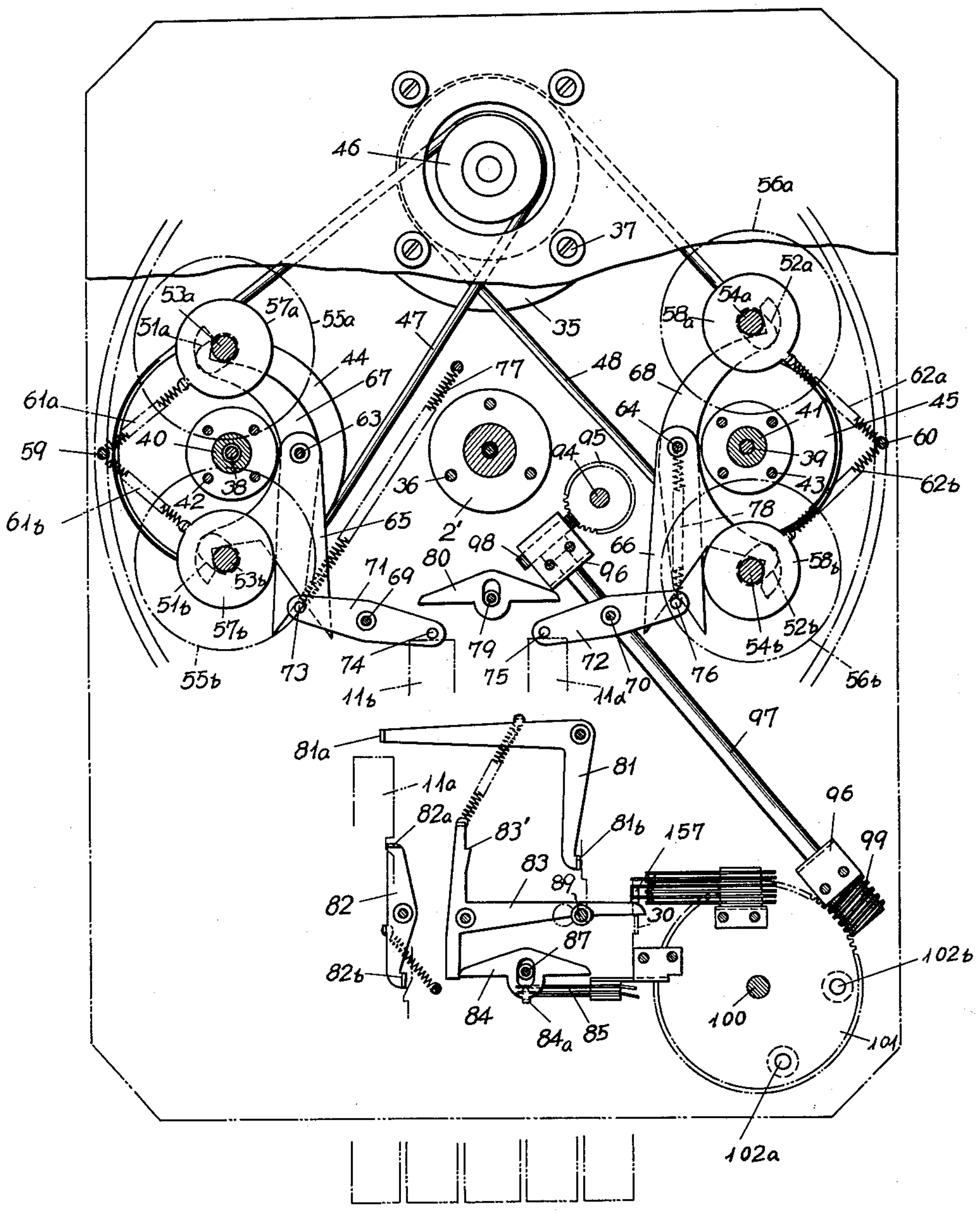
FIG. 8 shows a plan view of components mounted on the base plate with the greater part of the base plate broken away.

As clearly shown in FIG. 8, pins 63 and 64 secured on the lower face of the base plate intermediate the sleeves 40, 41 and the central shaft 2 respectively pivot the corresponding ends of forked arms 65 and 66 and fulcra of levers 67 and 68. One of the forked ends of each of the forked arms 65 and 66 and one arm-end portion of each of the levers 67 and 68 are curved to partially embrace the spindles 53*b* and 54*b*, and 53*a* and 54*a* respectively. The other of the forked ends of each of the arms 65 and 66 and the other arm-end portion of each of the levers 67 and 68 cross each other with opposed edges from each other for a scissor like intersection.

Figure 9:
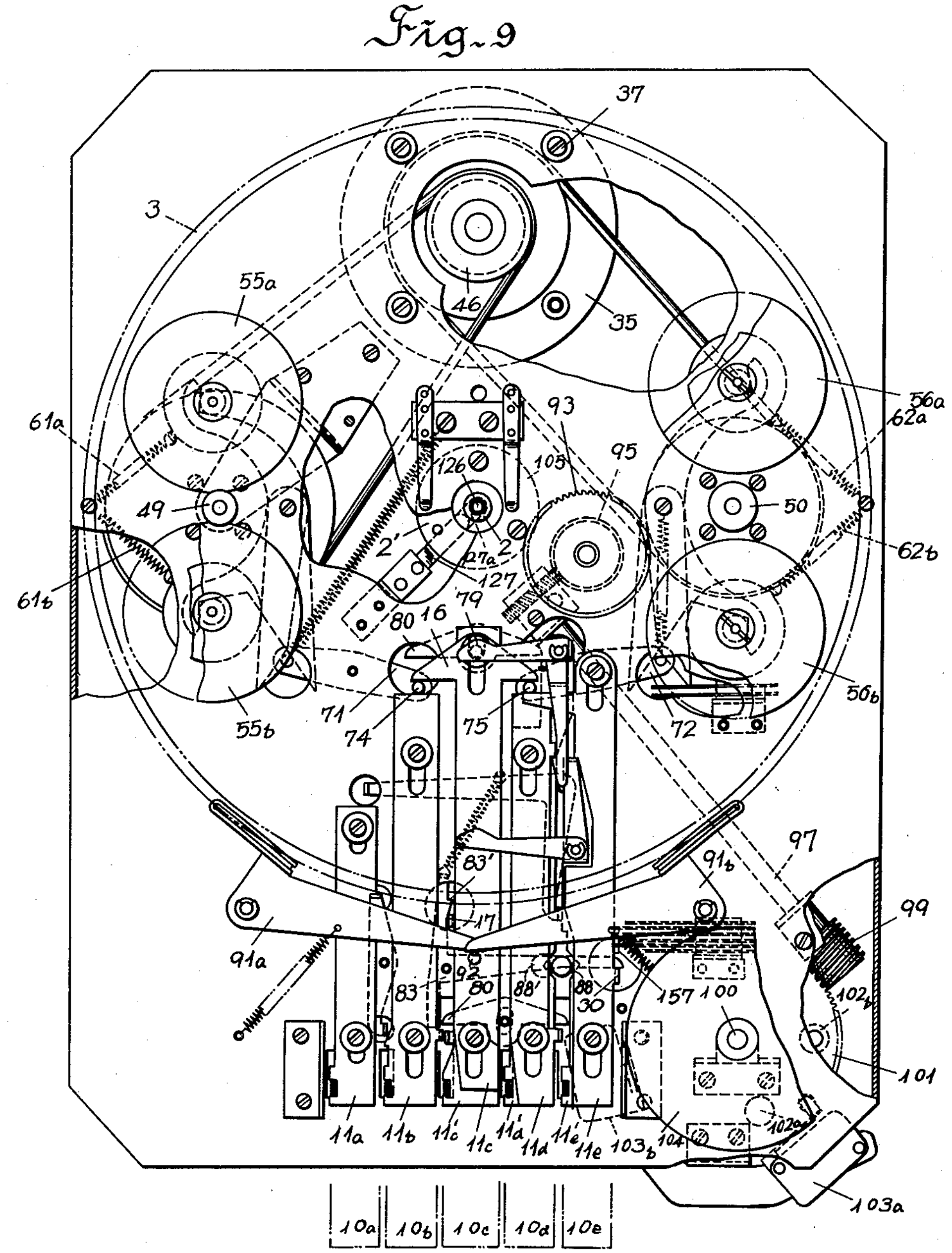
FIG. 9 shows a replica of FIG. 7 including the components in FIG. 8 shown in dotted lines.

In addition, the base plate includes a pair of levers 71 and 72 rotatably pivoted by pivots 69 and 70 respectively and carrying pins 73, 74 and 75, 76 at their ends respectively. The pins 73 and 76 extend downwardly and are inserted respectively between the crossed, scissor-like edges abovementioned, and connected to the base plate through strong tension springs 77 and 78 respectively to bias the lever 71 clockwise and the lever 72 counterclockwise as viewed in FIG. 8. However, the rotational movement of the levers 71 and 72 is normally prevented by means of the upwardly extending pins 74 and 75 pressing against the extremities of the locking pieces 11*b* and 11*d* nearer the central shaft 2 (or against the lateral arm 28 of the locking piece 11*e*). With all the locking pieces in their inoperative positions as shown in FIGS. 7 and 9, and at distances farthest away from the central shaft 2, each of the pins 73 and 76 on the levers 71 and 72 are deeply engaged between the pair of the crossed, scissor-like edges and thereby open them. Accordingly the spindles 53*a*, 53*b*, 54*a* and 54*b* will be biased to the inner extremities of the associated slots respectively. When the said spindles are so biased, the peripheries of the transmission friction wheels 53*a*, 55*b*, 56*a* and 56*b* will not contact the internal surface of the pendent peripheral wall of the lower rotatory disk 3 which covers these wheels with the central shaft 2 on the base plate fitted into the central bore 4. In fact, the wheels will be positioned with respect to the rotatory disk 3 such that they are slightly separated from it.

With the locking pieces in their inoperative positions (see FIGS. 7 and 9), the locking piece 11*c* cooperates with the locking pieces 11*b* and 11*d* to engage the pins 74 and 75 which extend through the base plate and rising upwardly, between those sides of the triangular head of the former piece substantially perpendicular to the longitudinal axis of the same and the extremities of the latter pieces near the central shaft 2. Also a pin 79 for guiding the locking piece 11*c* (see FIG. 9) projects downwardly beyond the base plate and is loosely fitted into a longitudinal slot centrally formed in an angle lever 80 (see FIGS. 8 and 9). If the lever 71 disposed on the left-hand side of the lever 80 rotated counterclockwise the pin 74 will engage the lever 80 to rotate it clockwise, whereupon the lever 80 prevents clockwise movement of the lever 72 disposed on its opposite side. If the lever 72 is rotated clockwise the pin 75 will engage the lever 80 to rotate it counterclockwise, whereupon the lever 80 prevents counterclockwise movement of the lever 71.

Figure 11:
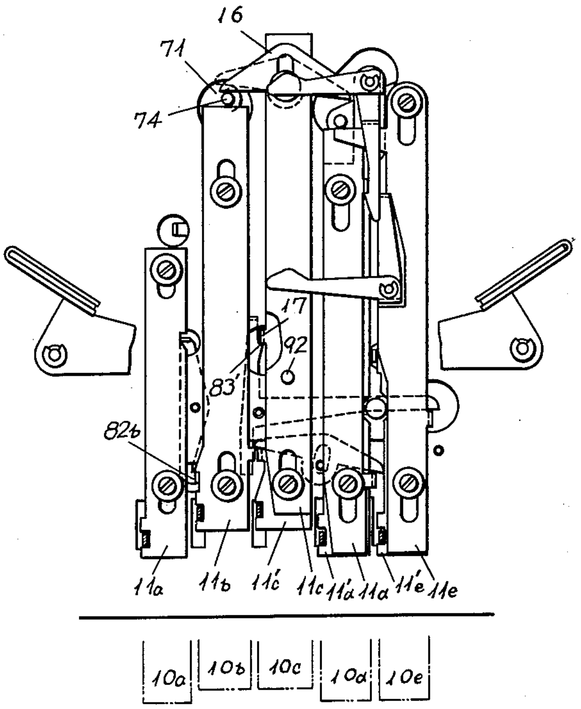
FIG. 11 shows a fragmental plan view of the base plate with the normal rotation key and a record key depressed.

The base plate is further provided with a bell crank 81, a lever 82, a T-shaped lever 83, an angle lever 84 and an electric switch 85 for the motor on the lower side and opposed to the locking pieces (FIGS. 8 and 9). In the inoperative state as shown in FIG. 9 the bell crank 81 is biased to rotate counterclockwise and an upright lug 81*a* formed on one arm end of the lever 81 projects upwardly beyond the base plate and is positioned at a point slightly nearer the middle of the plate than the upper end of the locking lever 11*a* as viewed in FIG. 9. Similarly an upright lug 81*b* formed on the other arm-end, the lug projecting upwardly beyond the base plate and pressing against the left-hand edge of the locking piece 11*e'*. It will be seen that the locking piece 11*e'* includes a stepped notch formed on left-hand edge thereof and spaced lower than said pressing point (as viewed in FIG. 9). The lever 82 is biased counterclockwise and has upright lugs 82*a* and 82*b* formed at its opposite ends, the lugs extending through the base plate. When the locking piece 11*b* slides forward or toward the middle of the base plate, the upright lug 82*b* formed on the lever 82 engages the notch 14 of the locking piece 11*b* and the lug 82*a* engages the notch 13 of the locking piece 11*a*. The T-shaped lever 83 is biased clockwise and includes a projecting shoulder 83' formed on one of the side arms thereof. The sliding movement of the locking piece 11*e'* toward the middle of the base plate effects engagement of the shoulder 83' with pendent lug 17 (see FIG. 11) and the sliding movement of the locking piece 11*e* toward the middle of the base plate releases that engagement. At the same time, the latter movement effects abutment of the other side-arm end of the lever 83 with the pendent lug 18 formed on the left-hand edge of the locking piece 11*c'* (FIG. 13) to prevent the piece 11*c'* from sliding. The angle lever 84 defines a central, longitudinal slot in which a pin 87, secured to the lower face of the base plate, is loosely fitted, and has a pendent lug 84*a*. When the locking piece 11*c'* or 11*d'* is moved forward or toward the middle of the base plate, the lever 84 will be driven respectively by the pendent lug 18 of the locking piece 11*c'* or by the pendent lug 20 of the piece 11*d* to be turned clockwise or counterclockwise respectively. In either case, the pendent lug 84*a* is operative to close the switch 85 of the motor.

Figure 12:
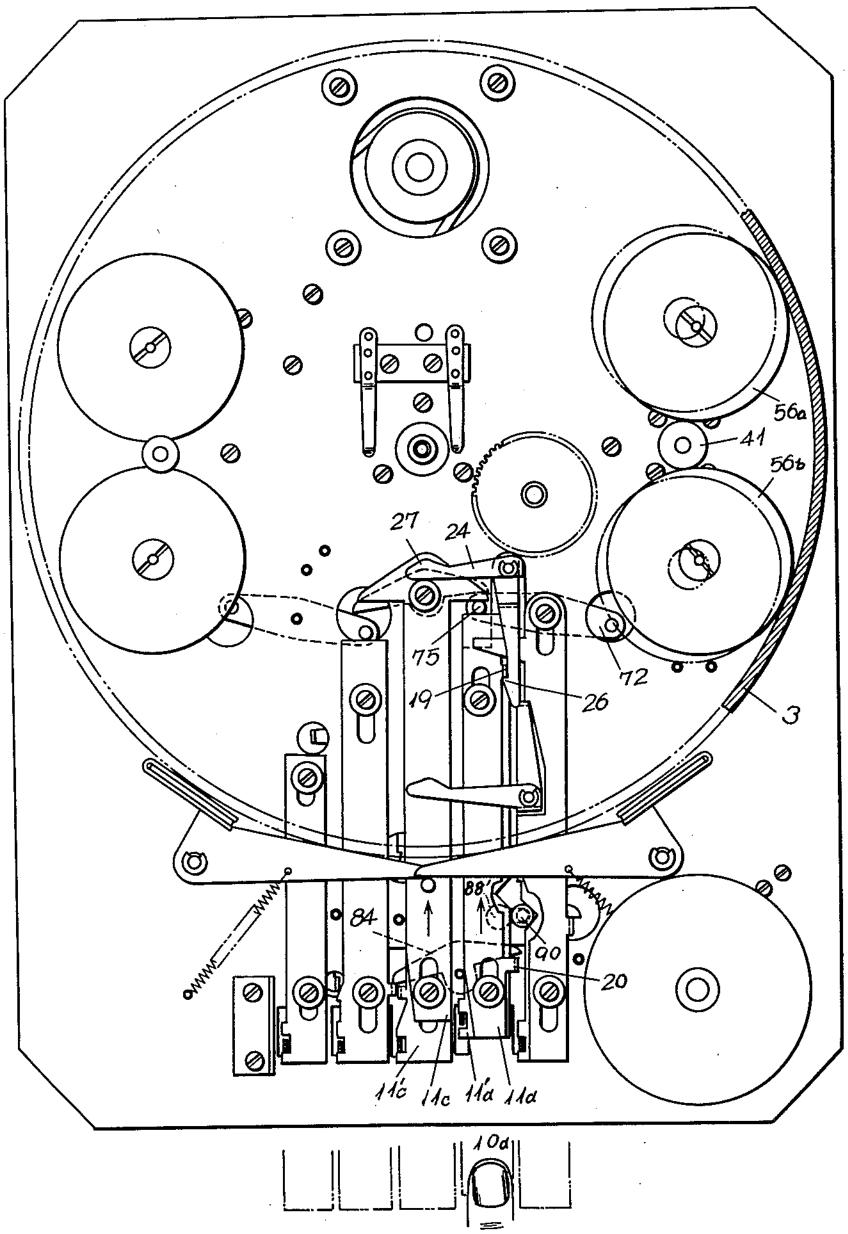
FIG. 12 shows a plan view of the base plate with a high speed rotation key depressed.
Figure 15:
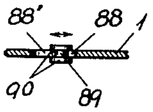
FIG. 15 shows a section taken along the line XV—XV of FIG. 14.
Figure 14:
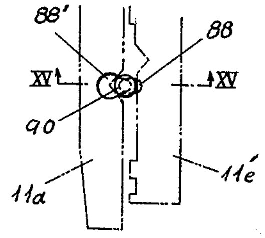
FIG. 14 shows a plan view of safety means for preventing the simultaneous depression of the high speed rotation and reverse keys.
Figure 13:
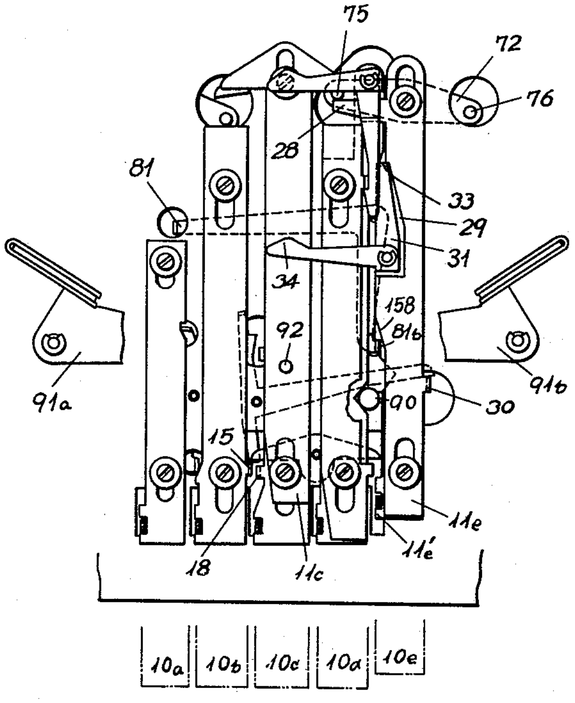
FIG. 13 shows a fragmental plan view of the base plate with a reverse key depressed.

Referring now to FIGS. 9, 14, and 15, the base plate is provided with a cross slot 88 directly below a space formed by the opposed V-shaped notches 21 and 22 formed on the locking pieces 11*d'* and 11*e'* respectively. The slot 88 communicates with a circular opening 88' and has inserted thereinto a rod 89 having one small disk at each end. The rod 89 can be inserted into the opening 88' and then passed to the slot 88. If one of the locking pieces 11*d'* or 11*e'* will be moved forward, the disk 90 will be forced into the V-shaped notch 21 by the action of the tilted edge of the V-shaped notch of the other piece (FIGS. 12 and 13). This prevents the locking pieces 11*d'* and 11*e'* from simultaneously sliding in the forward direction.

Figure 10:
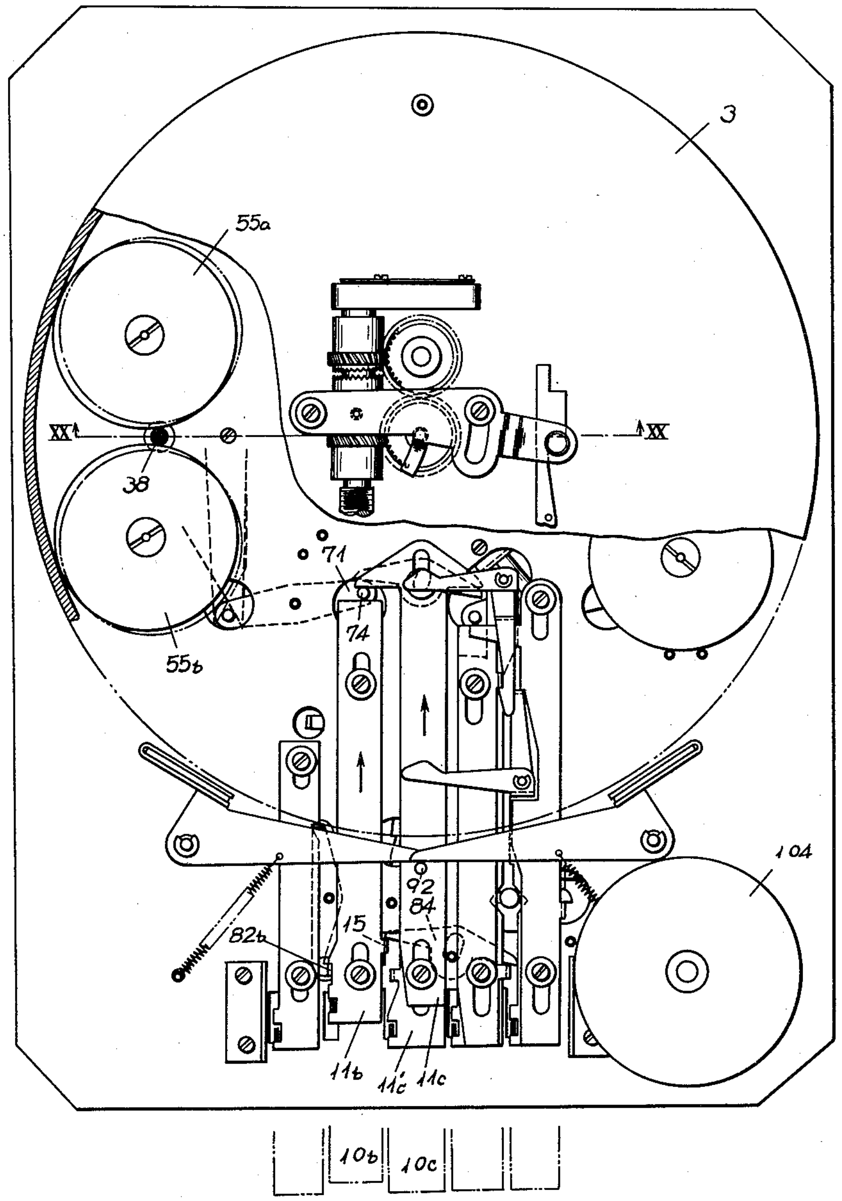
FIG. 10 shows a plan view of the base plate with a rotary disk mounted thereon and partially cut away and with a normal rotation key depressed.

From FIG. 7 it is seen that a pair of levers 91*a* and 91*b* is pivoted on the upper face of the base plate and each lever is biased to rotate in the opposite directions by means of respective tension springs. Each of the levers 91*a* and 91*b* is provided on one arm thereof with a braking member adapted to press against the peripheral wall of the rotatable disk 3. The levers 91*a* and 91*b* have end portions of the other arms overlapping each other and spaced from the peripheral wall of the rotatory disk. When the locking piece 11*c* is moved forward a pin 92 secured to the base plate pushes the overlapped end portions of the levers upwardly as viewed in FIG. 10 and separates the braking members from the rotatory disk 3.

The base plate also includes a spur gear 93 with its shaft 94 rotatably supported on the upper face. The shaft 94 carries a helical gear 95 at its end portion projecting beyond the lower face of the base plate (FIG. 8). A pair of bearing members 96 secured to the lower face of the base plate rotatably supports a bar 97 which, in turn includes one end portion carrying a helical gear 98 meshing with the helical gear 95 and the other end portion to which a worm 99 is secured that meshes with a worm wheel 101 mounted on a vertical shaft 100 extending through the base plate and suitably supported thereby. The worm wheel 101 carries on its lower face two round protrusions 102*a* and 102*b* having different lengths. These protrusions are constructed and arranged such that, during forward or reverse rotation of the worm wheel 101, the corresponding protrusion opens the associated one of two limit switches 103*a* and 103*b* secured to the lower face of the base plate and differently spaced therefrom to be respectively engaged by their respective associated protrusions of different lengths. As shown in FIG. 22, the switches 103*a* and 103*b* are connected in a circuit for driving the motor 35 and the opening of them denergizes the motor. A graduated disk 104 (FIGS 7 and 21) is secured to the said vertical shaft 100 at its top and has its periphery divided into segments on each side of a reference line. The segments may be represented in the term of minute, and indicates the duration of revolution of the rotatory disk 3 and hence the recording duration. The disk 104 is visible through a window formed on the top plate of the casing as shown in FIG. 1.

As shown in FIG. 20, the rotatory disk 3 is provided on the lower face with a hub to which a spur gear 105 of an electrically insulating material is secured by means of screws 106 (one of which is shown) with its hub including inner and outer peripheries to which metallic rings 107 and 108 are rigidly secured. A metallic tubular shaft 109 rigidly mounted in both hubs is fitted around the shaft 2 for rotation with the shaft 2 which projects beyond the shaft 109. This projecting portion of the shaft 2 mounts a stepped gear comprising a spur gear 110 and a helical gear 111, which is secured thereon by a set screw 112. Another stepped gear comprising a spur gear 114 and a helical gear 115 is rotatably mounted on a stud 113 secured to the upper face of the base plate with the gear 114 meshing with the gear 110. The gear 110 is equal to the gear 114 in diameter and number of teeth. The gear 111 also is equal to the gear 115 in diameter and number of teeth but has a diameter less than the gear 110.

Figure 5:
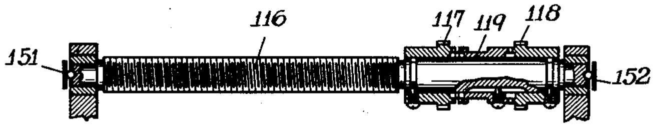
FIG. 5 shows a side view of a feed screw along which a transducer is moved.

A feed screw 116 is disposed above the rotatory disk 3 in substantially parallel relationship with a plane containing the central axes of both the stepped gears above described. As clearly shown in FIG. 5, a pair of spaced helical gears 117 and 118 is rotatably mounted on the feed screw 116 against longitudinal movement, and with a clutch member 119 keyed on the rod between the gears for longitudinal movement. The longitudinal movement of the clutch member 119 in either direction effects engagement of the corresponding irregular end face thereof with the associated irregular end portion of the gear 117 or 118. The helical gears mesh with the helical gears 111 and 115 respectively.

Figure 2:
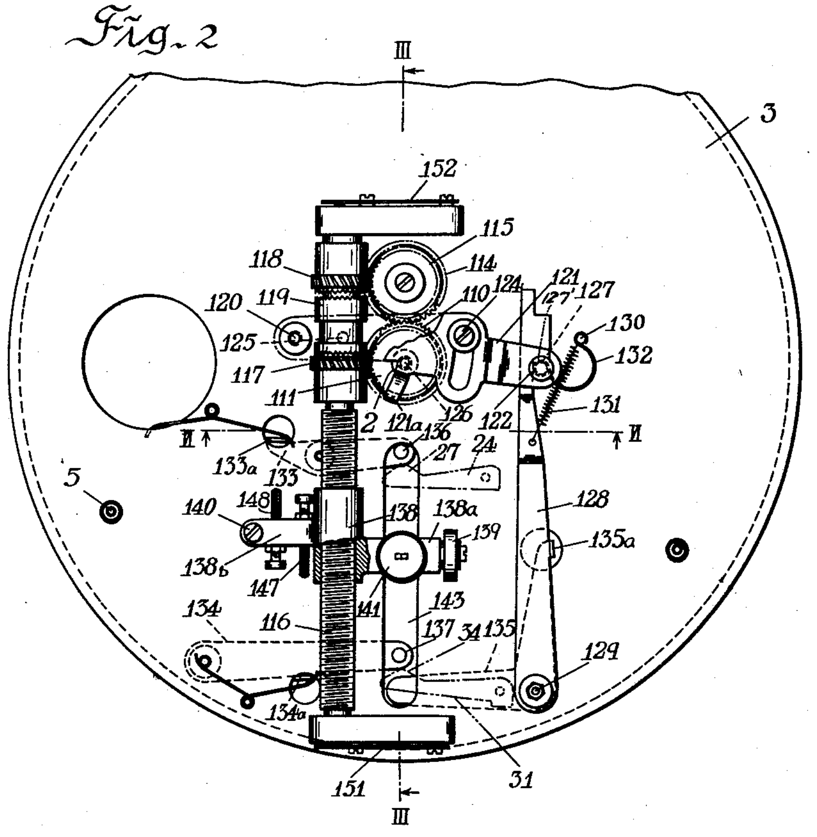
FIG. 2 shows a plan view of a lower rotary disk.
Figure 6:
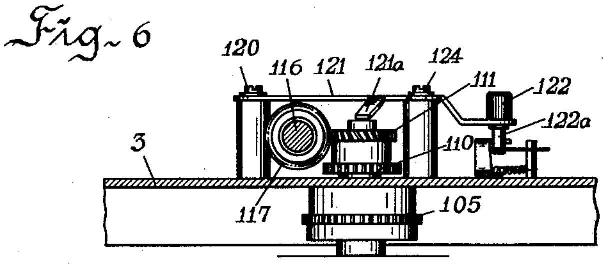
FIG. 6 shows a section taken along the line VI—VI of FIG. 2.

A stem 120 is secured to the rotatory disk 3 on one side of clutch member 119 and includes an element 121 pivoted at its upper end. The control element 121 is provided on its free end with a knob 122 accessible through an arcuate opening 123 formed on the upper circular plate 6 rotatable together with the lower rotatory disk 3 as one unit. The control element 121 defines on the intermediate portion an arcuate slot adapted to cooperate with a pin 124 rising from the rotatory disk 3 to restrict the rocking of the control element. A short pin 125 is secured to the lower face of the control element 121 in such a way as to engage the reduced diameter portion of the clutch member 119 for controlling the longitudinal movement of the clutch. As more clearly shown in FIG. 6, the control element 121 has a tab 121*a* extending obliquely downward therefrom. A thin cylindrical bar 126 of an electrically insulating material is loosely inserted in the tubular shaft 2 on the base plate and has its lower end resting on movable resilient contacts 127*a* of a double pole switch 127 and has its upper end either brought lightly in contact with the lower face of the control element 121 or disposed adjacent to the same when the element is in the position as shown in FIG. 2. When the element is rotated in the counterclockwise direction as viewed in FIG. 2, the bar 126 is depressed by the downwardly tilted surface of the tab 121*a* to thereby depress the movable contacts 127*a* against their resilience. This results in the reverse rotation of the motor. Simultaneously the clutch member 119 is axially moved to engage its irregular end surface with the irregular end surface of the gear 118. According to the present invention, therefore, the switching of the clutch effects simultaneously the reverse rotation of the motor so that the feed screw 116 is not changed in the direction and speed of rotation.

On the upper face of the lower rotatable disk 3 a substantially Z-shaped arm strip 128 is pivoted by an end at a point 129. The strip has a free end portion with an enlargement forming shoulder 127 and is biased in the clockwise direction (as viewed in FIG. 2) by the action of a spring 131 having one end connected to the disk at a point 130. A curved resilient wire or spring 132 has one end connected to the extension 122*a* of the knob 122 and the other end secured to the point 130. Because of its expanding action the spring 132 biases the control element 121 about the pivot 120 in the clockwise direction as viewed in FIG. 2. With the components in the positions as shown in FIG. 2, the extension 122*a* of the knob engages the shoulder 127' of the arm strip 128 to thereby prevent it from turning in the clockwise direction as shown in FIG. 2.

The rotatory disk 3 also includes a lever 133, an arm strip 134 and a bell crank 135 pivoted on the lower face. The lever 133 is biased counterclockwise as viewed in FIG. 2, and has an arm end portion on which a bent lug 133*a* is formed and projects beyond the upper face of the disk through a circular opening formed therein. A pendent pin 136 carried by the other arm end of the lever 133 is positioned adjacent to the angle edge 27 of the lever 24 coupled to the locking piece 11*d'*. The arm strip 134 is biased counterclockwise as viewed in FIG. 2 and has a bent lug 134*a* on its side that projects beyond the upper face of the rotatory disk 3 through a circular opening formed therein. A pendent pin 137 carried by the free end of the arm strip 134 is positioned adjacent to the angle edge 34 of the lever 31 coupled to the locking piece 11*e'*. The bell crank 135 is pivoted at the same point 129 as the strip 128 and is biased counterclockwise as viewed in FIG. 2. The bell crank 135 has, on a side of its arm end, a bent lug 135*a* projecting upwardly beyond the rotatory disk 3 through a circular opening formed therein and engages on right-hand edge of the arm strip 128. The other arm end of bell crank 135 has an inner edge facing the outer edge of the free end of the arm strip 134 with a small spacing therebetween.

The feed screw 116 engages a short sleeve 138 which has on one side a frame member 138*a* extending substantially perpendicularly. The end of the frame member spaced farthest from the screw 116 carries a roll 139 adapted to contact the upper face of the rotary disk. An arm 138*b*, extending from the opposite side of the sleeve 138, has an end portion in which an adjusting screw 140 is screwed. The screw 140 can be rotated to contact with its lower end the upper face of the rotatory disk 3 to thereby maintain the frame member 138*a* substantially parallel to disk 3.

A hollow member 141 for mounting a recording and reproducing head of a transducer is loosely inserted in the frame member 138*a* in the vertical direction and held in suspension with respect to the frame member by the action of a compression spring 142 inserted between a flange 141*b* and the upper face of the frame bottom. The head resiliently carried by the mounting member 141 has electrical leads (not shown) threading through a supporting tube 141*a* and then downwardly, through a slot 143 radially formed in the rotatory disk and electrically connected to the concentric metallic rings 107 and 108 secured to the hub of the disk and electrically insulated therefrom. When the rotatory disk overlaps the base plate, these metallic rings are adapted to respectively contact resilient electrical conductors 145*a* and 145*b* mounted on the upper face of the base plate through an electrically insulating member 144 (FIG. 7). The conductors 145*a* and 145*b* have respective electrical leads (not shown) threading downwardly through an opening 146 formed in the base plate adjacent to the insulating member 144 and then connected to an output or input of a suitable amplifier (not shown) as the case may be.

A pair of adjusting screws 148 and 147 horizontally screwed in the arm 138*b* extending from the short sleeve 138 is arranged to engage the lugs 133*a* and 134*a* projecting beyond the upper face of the rotatory disk respectively when the sleeve being longitudinally moved along the feed screw 116 reaches the respective limits of its range.

The feed screw 116 for moving the recording and reproducing head along it longitudinally, carries the pair of gears 117 and 118 meshing with the associated gears respectively. In order to make such meshing smooth, bearing blocks 149 and 150 for journalling the feed screw 116 is pushed in the opposite directions by leaf spring 151 and 152 through balls inserted therebetween respectively, whereby the screw 116 is axially moved more or less in accordance with the meshing of the gears.

In order to make the weight distribution of the rotatory disk uniform, an opening 115' may be provided in that side of the same where the rod 116 is disposed.

Figure 21:
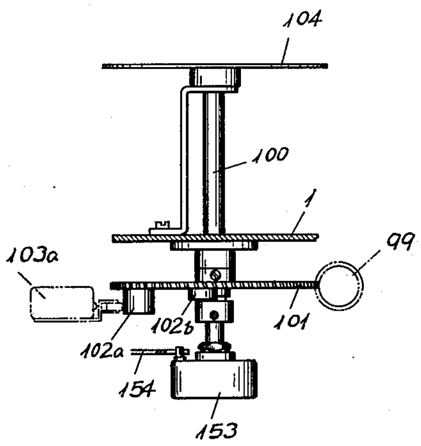
FIG. 21 shows a side view of a disk mounted for recording or reproducing information and a support therefor.
Figure 22:
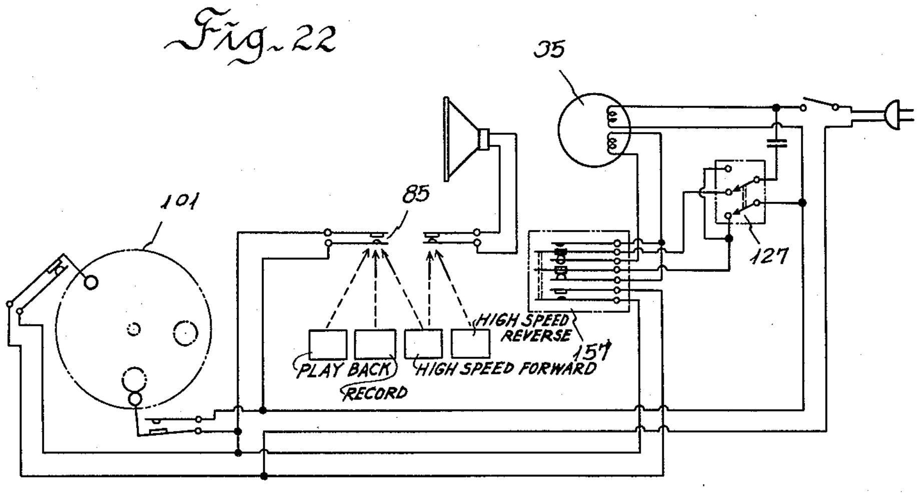
FIG. 22 shows a schematic diagram of an electrical circuit suitable for use with the invention.

As shown in FIG. 21, the graduated disk 104 will advantageously be coupled directly with a potentiometer 153 or a variable resistor, whereby the resistance can be changed by turning the disk. The potentiometer is held stationary by means of a supporting bar 154 suitably connected to the base plate. A sliding contact is caused to be moved through the shaft 100 of the disk 104. The purpose of the potentiometer will be explained hereinafter.

The operation of the machine above described is as follows:

First it is assumed that the present machine is used to record sound information on a magnetizable coating of a thin sheet material such as paper a fragment of which is designated M in FIG. 1. Such sheet material carries a magnetizable coating comprising a thin layer of a finely pulverized, magnetizable material on one face. As shown in FIG. 1, the sheet material M is placed on the top of the casing with the mangetizable coating directly in contact with the top face.

A pair of dowels 156 formed on the top face of the casing adjacent to the opposite edges is fitted in a pair of perforations in the sheet material M to thereby maintain the same in a predetermined stationary position. The sheet material thus disposed is overlapped with a hinged lid 155 made preferably of a light transparent material.

It is now assumed that all the movable components mounted to the base plate are in their inoperative positions as shown in FIGS. 7 and 9 and that the short sleeve 138 for carrying the transducer is at the outermost limit of its range of travel along the feed screw 116, that is, in the lowest position as viewed in FIG. 2. The depression of the key 10*c* effects closing of an electric switch (not shown) to permit an electrical signal representative of the sound information to flow through the coil of the recording head. At the same time, the locking piece 11*c'* is moved forward or toward the middle of the base plate, whereupon its pendent lug 17 engages the shoulder 83' of the T-shaped lever 83. In addition, the pendent lug 18 of the piece 11c' simultaneously rotates the angle lever 80 clockwise to permit the energization of the motor which in turn drives the friction drive wheels 49 and 50 through the belts. When the key 10b is then depressed (see FIG. 11), the locking piece 11b is moved forward to engage its notch 14 with the upright lug 82b of the lever 82. At the same time the extremity of the piece 11b rotates the lever counterclockwise through the pin 74 so that the friction transmission wheels 55a and 55b are brought in contact with the internal surface of the pendent peripheral wall 3' of the rotatory disk 3 under the action of the springs 61a and 61b respectively. Simultaneously, the pin 74 advances the angle head 16 resulting in the forward movement of the locking piece 11c. Accordingly, the pin 92 on the pieces 11c rocks the levers 91a and 91b to release the braking action on the rotatory disk 3. In this way, the lower rotatory disk 3 together with the upper circular plate 6 begins to be rotated as one unit. This rotation of the disk 3 and the plate 6 is called hereinafter a positive rotation which, in turn is assumed to be effected in the clockwise direction as viewed in the drawings. During the rotation, the friction transmission wheel 55a drives the disk 3 whereas the other transmission wheel 55b acts merely as a follower.

Figure 3:
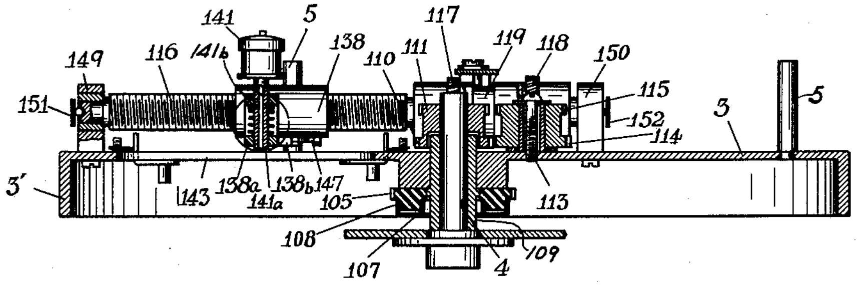
FIG. 3 shows a section taken along the line III—III of FIG. 2.
Figure 4:
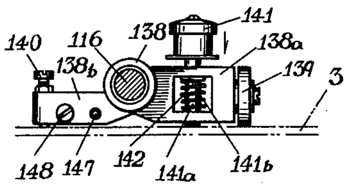
FIG. 4 shows a side view of a supporting unit for supporting a recording and reproducing head.

At the same time, as illustrated in FIGS. 2 and 3, the fixed helical gear 111 meshes with the helical gear 117 on the feed screw 116 so that the screw 116 is rotated with the rotatory disk 3 and the short sleeve 133 together with the recording head is moved toward the center of the disk 3 along the feed screw. Therefore, the recording head in contact with the recording medium produces a recorded spiral track on the magnetizable coating thereof.

The rotational movement of the disk 3 is transferred through the gear 105 below the base plate 1 to the gear 93 above the same plate and thence to the long bar 97 through the helical gears 95 and 98 coaxial with the gear 93. The worm 99 carried at the end of the bar 97 drives through the worm wheel 101 the gradutaed disk for indicating the recording duration in the clockwise direction.

When the sleeve 138 with the recording head reaches the inner limit of its range, the longer protrusion 102a actuates the limit switch 103a rather than the limit switch 103b, whereupon the motor 35 is deenergized. The deenergization of the motor stops the mechanical motion of the entire machine. It is noted that the shorter protrusion 102b does not contact with the limit switch 103a positioned at a lower level as compared with the switch 103b. Then the sheet material M thus recorded can be removed from the machine after the lid 155 has been opened.

The recording head must now return to its original position in order to record another sound information on a new sheet material or to reproduce the sound information recorded on the sheet material. In such case, it is preferable to rapidly return the recording head to its original position.

The invention also contemplates to rapidly return the transducer to its original or outermost position.

After the completion of the recording operation above described, the depression of the key 10e effects the forward movement of the locking pieces 11e and 11e' because the pendent lug 33 of the bell crank 31 coupled to the piece 11e' is in engagement with the notch 29 of the piece 11e (FIG. 13). These pieces then are held in their advanced positions by the engagement of the upright lug 81b of the bell crank 81 with the shoulder 86 of the locking piece 11e'. Simultaneously the arm 28 of the locking piece 11e advances the pin 75 on the lever 72 to rotate the lever clockwise to thereby connect each of the friction transmission wheels 56a and 56b with the driving friction wheel 50 and the inner surface of the pendent peripheral wall 3' of the rotatory disk 3 respectively. In addition, the pendent lug 30 of the locking piece 11e abuts against the movable contacts of the switch 157 to allow the motor to be rotated in the reverse direction. As the lever 72 pivoted the locking piece 11c is moved forward whereby the rotatory disk 3 is freed from the braking action. Thus the disk is rotated counterclockwise. The driving friction wheel 50 now operated is larger in diameter than the drive wheel 49 described in conjunction with the recording operation. Therefore, the speed of reverse rotation of the disk 3 is higher than its speed during the recording. In this case it is noted that the transmission friction wheel 56a actually drives the rotatory disk 3.

The gear 117 and the feed screw 116 are thus rotated in the opposite direction at higher rate as compared with the recording operation. This leads to rapid retrogression of the sleeve 138 with the recording head along the feed screw 116. At the limit of the retrogression, the screw 147 abuts against the upright lug 134a of the arm strip 134. Then the pin 137 on the strip 134 pushes the angle edge 34 of the bell crank 31 to disengage the lugs 33 of the crank from the notch 29 of the locking piece 11e. Thereby the locking piece 11e first retrogresses, and then a tilted edge 158 formed on the piece 11e engages the upright lub 81b of the bell crank 81 resulting in retrogression of the locking piece 11e'. At the same time, the lever 72 below the base plate is rotated counterclockwise thereby separating the transmission friction wheels 56a and 56b from the rotatory disk 3. The counterclockwise movement of the lever 72 effects the retrogression of the locking piece 11c because the pin 92 on the piece is under the control of the braking levers 91a and 91b. As the operation just above explained has been effected the switch 157 is open and the braking is applied to the rotatory disk 3 whereby the disk is stopped.

When the recording head has reached the limit of its outer range, the free end of the arm strip 134 rotates the bell crank 135 in the counterclockwise direction as viewed in FIG. 2 to rotate the arm strip 128 counterclockwise by means of the movement of the lug 135a of the bell crank. This will be explained in more detail in conjunction with the preparation of a record matrix or mother plate which will be described hereinafter.

The invention provides also a play back machine. If it is desired to reproduce a sound information from a thin sheet material carrying the same then the sheet material is placed on the top plate of the casing as in the recording operation, and then the key 10b is depressed. It is now assumed that, with only the key 10b depressed, a reproducing head which is the same as the recording head previously described is automatically connected to an input of a suitable amplifier having a loudspeaker. The depression of the key 10b advances the locking piece 11b to engage its notch 14 with the upright lug 82b of the lever 82 below the piece 11b (FIG. 10), whereby the piece 11b is held in its advanced position. Simultaneously the pendent lug 15 of the piece 10b rotates the angle lever 84 clockwise to thereby energize the motor. The pin 74 in contact with the extremity of the locking piece 11b is moved to advance the locking piece 11c and thereby releasing the braking action on the rotatory disk 3. The clockwise rotation of the lever 71 carrying the pin 74 contacts the transmission friction wheel 55b with the pendent peripheral wall 3' of the rotatory disk 3 permitting the rotation of the same in the clockwise direction. Then the reproducing head is moved inwardly along its feed screw as in the recording operation. At the limit of the reproducing range of the head, the protrusion carried by the worm wheel 101 coaxial with the graduated disk 104 opens the limit switch to thereby deenergize the motor as in the recording operation. However, the machine can be made inoperative at any desired time by merely depressing the key 10a. The depression of the key 10a allows the locking piece 11a to be moved forward to rotate the lever 82 clockwise thereby returning the locking pieces 11b and 11c to their inoperative positions.

It is sometimes desirable to start playing back at any desired point of the recorded track. In such a case, a recorded sheet is placed on the top plate of the casing as previously explained, and then the key 10*d* is pushed down (FIG. 12). This allows the locking pieces 11*d* and 11*d'* to be moved forward as a unit, because the hook 26 of the bell crank 24 coupled to the locking piece 11*d'* engages the upright lug 19 of the piece 11*d*. Therefore, the pin 75 in contact with the extremity of the piece 11*d* is moved permitting the locking piece 11*c* to be moved forward. This forward movement of the piece 11*c* releases the rotatory disk 3 from the braking action and simultaneously rotates the lever 72 clockwise. Thus the transmission friction wheel 56*b* is brought in contact with both the friction drive wheel 41 and the pendent peripheral wall of the rotatory disk 3. Simultaneously, the pendent lug 20 rotates the angle lever 84 counterclockwise permitting the motor to be energized. Therefore, the motor is rotated at a high speed and hence the reproducing head also is moved inwardly along its feed screw 116 at a high speed. During this movement the operator looks at the segments on the graduated disk 104 and the key 10*d* is released at an instant the disk indicates a desired position. The release of the key 10*d* returns all the movable elements to their initial positions. Thus the reproducing head will be stopped at a desired point on the recorded track.

If the key 10*d* would remain depressed even when the reproducing head has reached its inward limit of its range, the screw 148 associated with the head abuts against the angle edge 27 of the bell crank 24 to disengage the hook 26 thereof from the upright lug 10 of the locking piece 11*d*. Therefore, the various movable elements return to their initial positions and the machine is inoperative with the reproducing head positioned at the inward limit of its range.

It has already been known to produce any suitable number of replicas from a recorded sheet by overlapping an unrecorded sheet with the recorded sheet. However, the transferred track is in effect a minor image of the recorded track. Therefore, if it is first intended to produce a record matrix or mother plate for use in transferring the sound information, then the rotatory disk must be rotated in the direction opposite to that used in the normal recording operation, that is in the counterclockwise direction as viewed in FIG. 2 with the recording head moved inwardly along the feed screw 116. For this purpose the illustrated machine is operated in the following manner.

When the recording head is positioned at the outermost limit of its range, the arm strip 128 is inclined toward the left-hand side as viewed in FIG. 2. The control element 12 for the clutch is then rotated in the counterclockwise direction as viewed in FIG. 2 to thereby cause the pin 125 carried by the element to switch the clutch and simultaneously to cause the tab 121*a* to push down the elongated cylindrical bar 126 loosely inserted into the central tubular shaft 2. The bar 126 then moves the movable contacts of the double pole switch 127 disposed directly below the same from one state to the other against the resilience thereof. With the switch 127 moved to the other state, the motor is arranged to be driven in the reverse direction. However, the gear 114 is rotated about the stationary central gear 110 and both the gears have the respective numbers of teeth as previously explained, so that the feed screw 116 does not change in the direction of rotation even when the clutch has been switched. Under such circumstances, the keys 10*c* and 10*b* can be pushed down to produce a desired record matrix with the rotatory disk 3 rotated in the counterclockwise direction while the recording head moved inwardly.

It will be seen that the keys 10*a* and 10*d* return back to their normal positions immediately after forces acting on them have been released. Each of the three remaining keys is adapted to be held in its lowered state after it has been depressed. Further, in order to prevent any number of the keys from being simultaneously pushed down, there is provided safety means among the various elements associated with the keys. While the safety means as to construction have been previously described the same will here be summarized.

With the locking piece 10*b* pushed down, the keys 10*a* and 10*c* can be pushed down but other keys cannot. With the locking key 10*c* pushed down, only the keys 10*a* and 10*b* can be pushed down. With the key 10*d* pushed down, only the key 10*a* can be pushed down. The depressed key 10*d* returns back to its normal position immediately after a force acting the same has been released. With the key 10*e* pushed down, only the key 10*a* can be pushed down.

As previously explained the disk 104 for indicating recording duration is coupled to the potentiometer or variable resistor 153. It is well known to those skilled in the art that a parallel arrangement of a resistor and a capacitor compensates for loss in high frequency portions of an electrical signal. It is also well known to those skilled in the art that in magnetic recording such loss is increased as a linear speed of a recording head is decreased and that in magnetic recording of disk type, that speed is higher on an outer track than on an inner track. In order to compensate for the loss in high frequency portion of a sound information to be recorded, the above-mentioned resistor 153 may be utilized. The resistor connected in parallel to a suitable capacitor may be inserted in a suitable portion of an amplifier circuit, for example, in a grid or cathode circuit of any suitable amplifier tube and the resistance value of the resistor is varied in accordance with the displacement of the recording head along the helical track. The resistor does not necessarily have to be connected directly to the shaft 100 of the graduated disk 104.

The magnetic recording and reproducing machine according to the invention has various advantages. For example, the machine is of small size and compact, the use of a single recording and reproducing head leads to a very simple construction, and expansion or contraction of a recorded sheet because of ambient moisture and/or temperature, makes any deviation small of a reproducing head which is tracing a recorded track of convoluted type. Therefore, a sound information is reproduced with greater validity.

While the invention has been described in conjunction with the preferred embodiment thereof, it is to be understood that numerous modifications and changes may be made without departing from the spirit and scope of the invention.

What I claim is:

1. In a magnetic recording and reproducing machine of spiral track type comprising a rotatory disk carrying a transducer, and a base plate for rotatably mounting the rotatory disk thereon, the combination of a friction drive wheel on the base plate adapted to be driven by a drive motor on the base plate, a pair of transmission friction wheels disposed symmetrically with respect to said drive wheel on the base plate, each of said transmission wheels having one position in which the same does not engage said rotatory disk and said drive wheel and the other position in which the transmission wheel engages frictionally said rotatory disk and said drive wheel, means for normally maintaining each of said transmission friction wheels in said one position, and means for forcing each of said transmission friction wheels from said one position to said other position, the pair of said transmission friction wheels being arranged such that, in said other positions one of the wheels is effective in transmission of power in accordance with the direction of rotation of the rotatory disk while the other of the wheels is ineffective.

2. In a magnetic recording machine of the type including a transducer adapted to be moved along a spiral path relative to a stationary recording sheet material to produce a magnetized track on the same, the combination of a reversibly rotatory disk carrying a transducer feeding screw, a pair of spaced helical gears on said feeding screw meshing a gear centrally disposed on said rotatory disk and an additional gear on the disk meshing said centrally disposed gear respectively, a clutch member disposed on said feeding screw between said spaced helical gears for axial movement, means for selectively driving said clutch member into engagement with one of said spaced helical gears, and an electrical switch controlled by said clutch member for reversing the direction of rotation of a drive motor.

3. In a magnetic recording machine of the type including a transducer adapted to be moved along a spiral path relative to a stationary recording sheet material to produce a magnetized track on the same, the combination of a reversibly rotatory disk carrying a transducer feeding screw, a pair of spaced helical gears on said feeding screw meshing a gear centrally disposed on said rotatory disk and an additional gear on the disk meshing said centrally disposed gear respectively, a clutch member disposed on said feeding screw between said spaced helical gears for axial movement, means for selectively driving said clutch member into engagement with one of said spaced helical gears, an electrical switch controlled by said clutch member for reversing the direction of rotation of a drive motor, means for preventing rocking movement of said selectively driving means, and means adapted to be operatively connected to said preventing means under the control of a transducer supporting member when the transducer reaches the outer end of its movement stroke.

4. In a magnetic recording and reproducing machine of the type including a rotatory disk carrying a transducer and inner and outer between limits thereon, the combination of a rotatable member operatively connected with the rotatory disk, a pair of protrusions having different lengths and secured to said rotatable member, said protrusion being circumferentially spaced apart and extending axially on said rotatable member and a pair of limit switches adapted to deenergize said machine secured thereto in position to be respectively engaged by the respective protrusions of different lengths to deenergize said machine at said inner and outer limits.

References Cited in the file of this patent

UNITED STATES PATENTS

| | | |
|---|---|---|
| 2,915,596 | Lyon | Dec. 1, 1959 |
| 2,929,633 | Hoskino | Mar. 22, 1960 |